United States Patent
Walker

(10) Patent No.: US 11,089,729 B2
(45) Date of Patent: Aug. 17, 2021

(54) CROP RELEASING FEEDER CHAIN SLAT

(71) Applicant: CNH Industrial America LLC, New Holland, PA (US)

(72) Inventor: Eric Lee Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 190 days.

(21) Appl. No.: 16/379,036

(22) Filed: Apr. 9, 2019

(65) Prior Publication Data

US 2020/0323138 A1    Oct. 15, 2020

(51) Int. Cl.
| | |
|---|---|
| *A01D 45/02* | (2006.01) |
| *B65G 15/52* | (2006.01) |
| *A01F 12/10* | (2006.01) |
| A01D 57/06 | (2006.01) |
| A01D 57/20 | (2006.01) |
| B65G 15/30 | (2006.01) |
| B65G 15/42 | (2006.01) |
| A01D 61/02 | (2006.01) |

(52) U.S. Cl.
CPC ............ *A01D 45/023* (2013.01); *A01F 12/10* (2013.01); *B65G 15/52* (2013.01); *A01D 57/06* (2013.01); *A01D 57/20* (2013.01); *A01D 61/02* (2013.01); *B65G 15/30* (2013.01); *B65G 15/42* (2013.01)

(58) Field of Classification Search
CPC ....... A01F 12/10; A01D 45/023; A01D 57/06; A01D 61/02; B65G 15/52; B65G 15/30; B65G 15/42
See application file for complete search history.

(56) References Cited

U.S. PATENT DOCUMENTS

| | | | |
|---|---|---|---|
| 44,277 A | | 9/1864 | Bradley |
| 571,846 A | | 11/1896 | Schuerman |
| 2,253,797 A | * | 8/1941 | Melroe ............... A01D 41/10 |
| | | | 56/364 |
| 2,341,977 A | | 2/1944 | Corbin |
| 2,385,829 A | * | 10/1945 | Melroe ............... A01D 89/003 |
| | | | 198/693 |
| 2,959,272 A | | 11/1960 | Jones |
| 3,896,611 A | | 7/1975 | Lingenfelter et al. |
| 4,202,159 A | * | 5/1980 | Young ................ A01D 57/00 |
| | | | 198/697 |

(Continued)

FOREIGN PATENT DOCUMENTS

EP    0312430 A1 *  4/1989  ............ A01F 12/10

*Primary Examiner* — Arpad Fabian-Kovacs
(74) *Attorney, Agent, or Firm* — Peter Zacharias; Patrick Sheldrake

(57) ABSTRACT

A combine feeder assembly having conveyors and slats pivotally connected to the conveyors to rotate about respective slat pivot axes. Each slat has a paddle that is movable between a first position in which the paddle extends outside the travel path of the conveyor by a first distance, and a second position in which the paddle does not extend outside the travel path or extends outside the travel path by a second distance that is less than the first distance. A cam surface moves the slats to the first slat position along a delivery path of the conveyors. A first housing wall extends over the delivery path and is spaced from the travel path by at least the first distance. A second housing wall extends over a return path. The second housing wall is spaced from the travel path by less than the first distance.

20 Claims, 5 Drawing Sheets

(56) References Cited

U.S. PATENT DOCUMENTS

| | | | | |
|---|---|---|---|---|
| 4,271,660 A * | 6/1981 | Kloefkorn | ............ | A01D 61/008 |
| | | | | 198/515 |
| 4,300,337 A * | 11/1981 | Sharp | ..................... | A01D 78/06 |
| | | | | 56/364 |
| 4,316,536 A * | 2/1982 | Verbeek | ................. | A01D 61/02 |
| | | | | 198/699 |
| 4,353,201 A * | 10/1982 | Pierce | ................... | A01D 57/08 |
| | | | | 56/130 |
| 4,366,898 A * | 1/1983 | Bobrysheva | ......... | A01D 89/003 |
| | | | | 16/380 |
| 4,412,612 A * | 11/1983 | Ackerman | ........... | A01D 89/003 |
| | | | | 198/697 |
| 4,495,755 A * | 1/1985 | Johnson | ................. | A01D 41/10 |
| | | | | 198/698 |
| 5,478,277 A * | 12/1995 | Kloefkorn | ............ | A01D 61/008 |
| | | | | 460/20 |
| 5,964,081 A * | 10/1999 | Ingram | ................ | A01D 89/003 |
| | | | | 56/119 |
| 7,473,168 B2 * | 1/2009 | Day | ....................... | A01D 61/04 |
| | | | | 460/16 |
| 7,866,136 B1 * | 1/2011 | Hill | ........................ | A01D 57/20 |
| | | | | 56/364 |
| 2002/0016192 A1* | 2/2002 | Moster | ................... | A01F 12/10 |
| | | | | 460/105 |
| 2004/0023739 A1* | 2/2004 | Linder | .................. | B65G 19/24 |
| | | | | 474/140 |

* cited by examiner

CROP RELEASING FEEDER CHAIN SLAT

BACKGROUND OF THE INVENTION

Agricultural combines are machines that gather crop materials and separate the desirable crop (grain, seeds, etc.) from the discardable material (straw, tailings, etc.). To do so, the combine typically collects all of the crop materials using a system including a header and a feeder. The header gathers a wide swath of materials from the ground, and moves them towards the feeder. The feeder conveys the consolidated crop materials to the threshing and separating system, which separates the desirable crop from the remaining material.

A typical feeder includes a conveyor system that must move all of the crop material that passes through the combine. Thus, the feeder assembly usually has chains or belts that drive paddles to move the crop material. The crop material can have various different shapes, sizes and other physical properties, can be dense and heavy, and can enter the feeder assembly in a variety of different orientations. Furthermore, the crop material can become entangled with the paddles, or be caught between the paddles and surrounding structures, such as a housing that surrounds the conveyor system. Thus, a typical feeder assembly may be driven with a relatively large amount of force to endure continuous operations despite the nature of the crop material and whether the crop material becomes entangled with the conveyor parts.

The inventor has determined that such feeder assemblies can be unnecessarily inefficient.

This description of the background is provided to assist with an understanding of the following explanations of exemplary embodiments, and is not an admission that any or all of this background information is necessarily prior art.

SUMMARY OF THE INVENTION

In one exemplary embodiment, there is provided a feeder assembly for an agricultural combine. The feeder assembly has a front rotation support configured to rotate on a first axis extending in a transverse direction, a rear rotation support configured to rotate on a second axis extending in the transverse direction, and a number of flexible conveyors wrapped around the front rotation support and the rear rotation support along a closed travel path. The closed travel path has a first span extending between the front rotation support and the rear rotation support, and a second span extending between the front rotation support and the rear rotation support. The assembly also has a plurality of slats extending by a slat width dimension in the transverse direction and pivotally connected to the plurality of flexible conveyors to rotate about a respective slat pivot axis extending in the transverse direction. Each slat has a paddle that is movable between a first slat position in which the paddle extends outside the closed travel path by a first distance, and a second slat position in which the paddle does not extend outside the closed travel path or extends outside the closed travel path by a second distance that is less than the first distance. The assembly has a cam surface positioned along the first span of the closed travel path and the configured to move the plurality of slats to the first slat position, a first housing wall extending in the transverse direction over the slat width dimension and along the first span, and a second housing wall extending in the transverse direction over the slat width dimension and along the second span. The first housing wall is spaced from the closed travel path by at least the first distance, and the second housing wall is spaced from the closed travel path by less than the first distance.

In another exemplary embodiment, there is provided a feeder assembly for an agricultural combine. The feeder assembly has a front chain support, a rear chain support, and a feeder housing forming an enclosed passage from an inlet adjacent the front chain support to an outlet adjacent the rear chain support. The feeder housing has a first wall, a second wall and side walls joining the first wall to the second wall. A number of chains are spaced from one another along a transverse direction, each chain extending in a respective closed loop around the front chain support and the rear chain support, and along a chain travel path having a first chain path portion extending along the first wall from the front chain support to the rear chain support, a second chain path portion extending around a portion of the rear chain support, a third chain path portion extending along the second wall from the rear chain support to the front chain support, and a fourth chain path portion extending around a portion of the front chain support. A motor is operatively connected to the chains and configured to move the chains continuously along the chain travel path in sequential order from the first chain path portion to the fourth chain path portion. The assembly has slats, which extend in the transverse direction and include slat pivots extending collinearly along a slat pivot axis extending in the transverse direction and connecting the slat to at least two of the plurality of chains, a first paddle extending from the slat pivot axis to a distal first paddle edge, and a cam follower offset from the slat pivot axis. Each slat is movable about the slat pivot axis between a first slat position in which the distal first paddle edge is located outside the chain travel path at a first paddle edge distance from the chain travel path and the cam follower is located a first cam follower distance from the chain travel path, and a second slat position in which the distal first paddle edge is located a second paddle edge distance from the chain travel path and the cam follower is located inside the chain travel path at a second cam follower distance from the chain travel path. The first paddle edge distance is greater than the second paddle edge distance, and the first cam follower distance is less than the second cam follower distance. The assembly also includes a cam track located inside the chain travel path, the cam track having a first cam track portion adjacent the first chain path portion. The first cam track portion is spaced from the first chain path portion by the first cam follower distance to thereby cause the plurality of slats to assume the first slat position along the first chain path portion. The first chain path portion is spaced from the first wall by at least the first paddle edge distance, and the third chain path portion is spaced from the second wall by less than the first paddle edge distance.

In another exemplary embodiment, there is provided an agricultural combine having a header, a threshing and separating system, a front chain support adjacent the header, a rear chain support adjacent the threshing and separating system, and a feeder housing forming an enclosed passage from the header to the threshing and separating system. The feeder housing having a first wall, a second wall and side walls joining the first wall to the second wall. A number of plurality of chains spaced from one another along a transverse direction, each chain extending in a respective closed loop around the front chain support and the rear chain support, and along a chain travel path having a first chain path portion extending along the first wall from the front chain support to the rear chain support, a second chain path portion extending around a portion of the rear chain support, a third chain path portion extending along the second wall from the rear chain support to the front chain support, and a fourth chain path portion extending around a portion of the front chain support. A motor is operatively connected to the plurality of chains and configured to move the chains continuously along the chain travel path in sequential order from the first chain path portion to the fourth chain path portion. A number of slats extend in the transverse direction, and each slat has slat pivots extending collinearly along a slat pivot axis extending in the transverse direction and connecting the slat to at least two of the plurality of chains, a first paddle extending from the slat pivot axis to a distal first paddle edge, and a cam follower offset from the slat pivot axis. Each slat is movable about the slat pivot axis between a first slat position in which the distal first paddle edge is located outside the chain travel path at a first paddle edge distance from the chain travel path and the cam follower is located a first cam follower distance from the chain travel path, and a second slat position in which the distal first paddle edge is located a second paddle edge distance from the chain travel path and the cam follower is located inside the chain travel path at a second cam follower distance from the chain travel path. The first paddle edge distance is greater than the second paddle edge distance, and the first cam follower distance is less than the second cam follower distance. A cam track is located inside the chain travel path. The cam track has a first cam track portion adjacent the first chain path portion, the first cam track portion being spaced from the first chain path portion by the first cam follower distance to thereby cause the plurality of slats to assume the first slat position along the first chain path portion. The first chain path portion is spaced from the first wall by at least the first paddle edge distance, and the third chain path portion is spaced from the second wall by less than the first paddle edge distance.

BRIEF DESCRIPTION OF THE DRAWINGS

Embodiments of inventions will now be described, strictly by way of example, with reference to the accompanying drawings, in which.

DETAILED DESCRIPTION OF THE DRAWINGS

Figure 1:
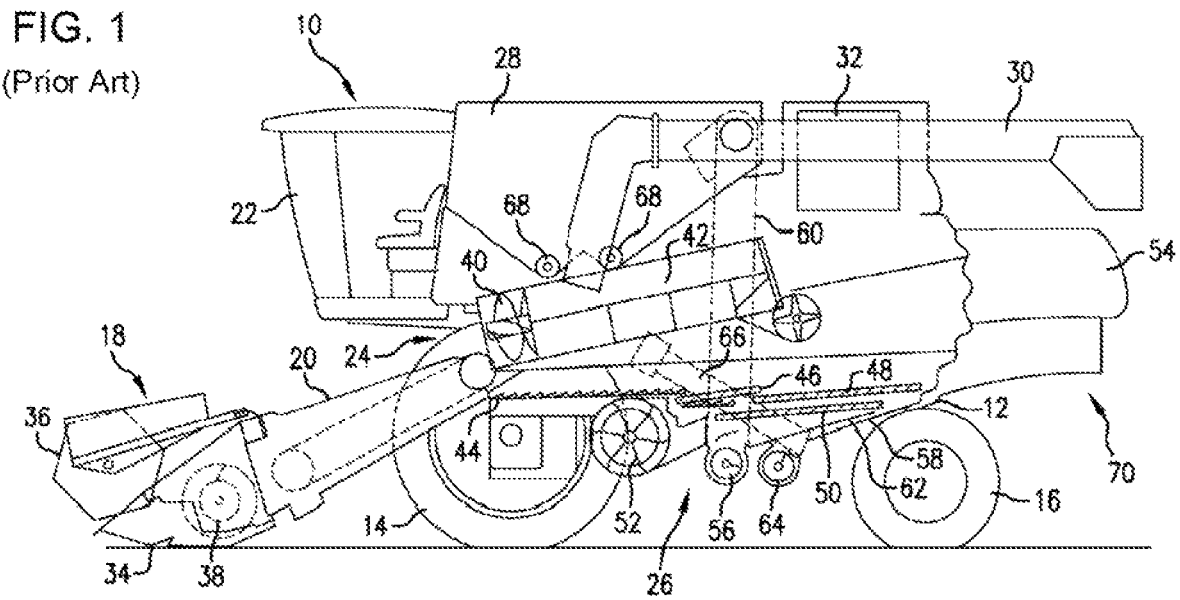
FIG. 1 schematically illustrates a prior art agricultural combine.

The drawing figures depict one or more implementations in accord with the present concepts, by way of example only, not by way of limitations. In the figures, like reference numerals refer to the same or similar elements.

The terms "crop" and "crop material" are used to describe any mixture of grain, seeds, straw, tailings, and the like. "Grain" or "seeds" refer to that part of the crop material which is threshed and separated from the discardable part of the crop material (e.g., straw and tailings), and includes grain in aggregate form such as an ear of corn. The portion of the crop material that generally is discarded or not used for food or growing purposes may be referred to as non-grain crop material, material other than grain (MOG) or straw.

Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Referring to FIG. 1, there is shown an example of a known agricultural harvester in the form of a combine 10, which generally includes a chassis 12, ground engaging wheels 14 and 16, a header 18, a feeder assembly 20, an operator cab 22, a threshing and separating system 24, a grain cleaning system 26, a grain tank 28, and an unloading auger 30. The operative components of the combine 10 are powered by a power plant in the form of a diesel engine 32 or the like.

It should be appreciated that while the agricultural harvester is shown as a combine 10, exemplary embodiments may be used with other equipment that harvests crop material (e.g., conventional combines, rotary combines, hybrid combines, chopper harvesters, etc.), or the like.

A typical header 18 is mounted to the front of the combine 10 and includes a cutter bar 34 for severing crops from a field during forward motion of the combine 10. A rotatable reel 36 may be provided to feed the crop into the header 18, and a double auger 38 feeds the severed crop laterally inwardly from each side toward the feeder assembly 20. The feeder assembly 20 conveys the cut crop to the threshing and separating system 24, and is selectively vertically movable using appropriate actuators, such as hydraulic cylinders (not shown).

The threshing and separating system 24 in the shown exemplary embodiment is of the axial-flow type, which is longitudinally oriented in the chassis 12 and includes a rotor 40 at least partially enclosed by and rotatable within a corresponding perforated concave 42. The cut crops are threshed and separated by the rotation of the rotor 40 and moved in an axially rearward direction within the concave 42. Larger elements, such as stalks, leaves and the like are discharged from the rear of combine 10. Smaller elements of crop material, including grain and MOG, are discharged through perforations of concave 42. The MOG typically includes particles that are lighter than the grain, such as chaff, dust and straw, but some heavier-than-grain particles also may be included.

Grain and MOG that has been separated by the rotor 40 and the perforated concaves 42 falls onto a main conveyance apparatus 44, which conveys the material toward the grain cleaning system 26. The grain cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52, which provides airflow through the sieves to remove chaff and other impurities such as dust from the grain, by making this material airborne for discharge from a straw hood 54 located at the back of the combine 10.

Clean grain falls to a clean grain auger 56 positioned crosswise below and in front of the lower sieve 50. The dean grain auger 56 receives clean grain from each sieve 48, 50 and from a bottom pan 62 of the grain cleaning system 26. The clean grain auger 56 conveys the clean grain laterally to a generally vertically arranged elevator 60, which can also be referred to as a grain elevator, for transport to the grain tank 28.

Tailings from the grain cleaning system 26 that fall down to a lower bottom pan 58 move to a tailings auger 64. The tailings are transported via tailings auger 64 and a return auger 66 to the upstream end of the grain cleaning system 26 for repeated cleaning action.

A pair of grain tank augers 68 at the bottom of the grain tank 28 convey the clean grain laterally within the grain tank 28 to the unloading auger 30 for discharge from the combine 10. The non-grain crop material proceeds through a residue handling system 70. Residue handling system 70 may include a chopper, counter knives, a windrow door, a residue spreader, and other features known in the art.

Figure 2:
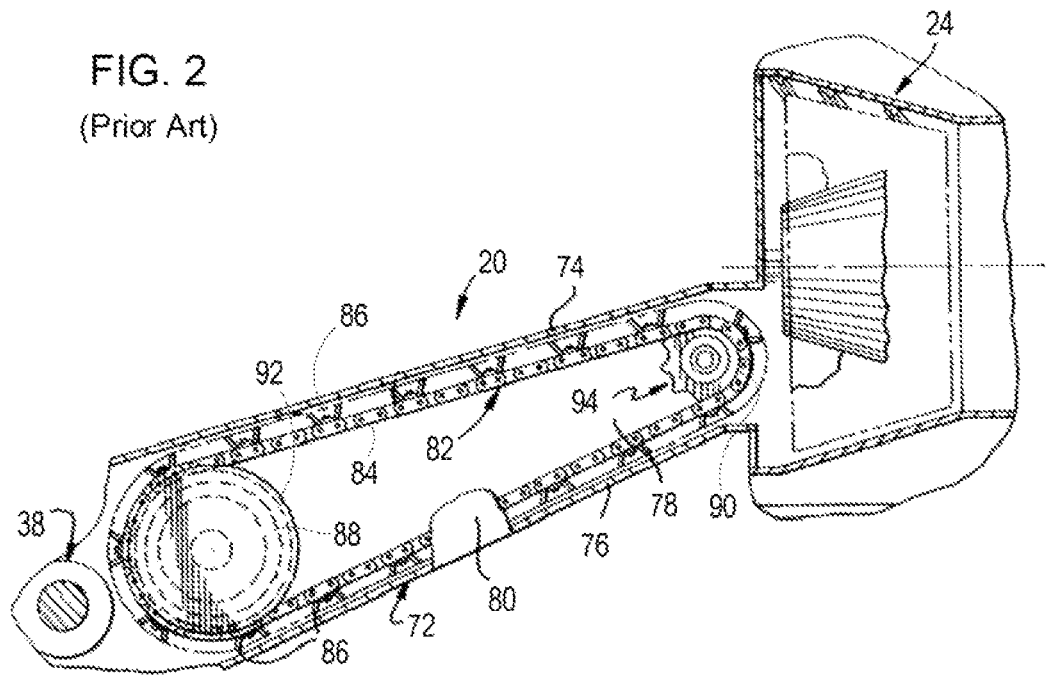
FIG. 2 is a partially cutaway side view of a prior art feeder assembly and adjacent portions of an agricultural combine.

In a typical combine 10, the entire bulk of the incoming crop material passes through the feeder assembly 20. FIG. 2 illustrates a typical prior art feeder assembly 20 in more detail. The feeder assembly 20 includes a feeder housing 72 having a top wall 74, a bottom wall 76 opposite the top wall 74, a first side wall 78 and a second side wall 80. Together, the walls form a passage extending from a front opening facing the header 18 (e.g., at the central portion of the double auger 38), to a rear opening facing the threshing and separating system 24. The rear end of the feeder housing 72 may be rigidly joined to the vehicle frame, or joined by a pivot or other movable joint, as known in the art.

Inside the feeder housing 72 is a conveyor assembly 82 formed by multiple laterally displaced endless chains 84 (only one chain 84 is visible in this side view). A plurality of slats 86 extend laterally from one chain 84 to the next. The chains 84 wrap around a front chain support 88 located adjacent the header 18, and a rear chain support 90 located adjacent the threshing and separating system 24. Additional supports may be provided at other locations. The chain supports 88, 90 may comprises single structures for all of the chains 84 or separate structures for each individual chain 84. For example, the front chain support 88 may comprise a series of wheels that are interconnected by a elongated tubular shaft known as a feeder drum 92, to support each chain 84 at the proper lateral position. The feeder drum 92 establishes a generally uniform gap between the feeder drum 92 and the lower wall 76 of the housing 72, which may be helpful to regulate and distribute crop intake.

One or more interconnected drive sprockets 94 are provided to apply a motive force to move the chains 84. Such movement causes the slats 86 on one side of the conveyor assembly 82 to move in a first direction from the header 18 towards the threshing and separating system 24 (the delivery path), and the slats 86 on the other side of the conveyor assembly 82 to move in a second direction from the threshing and separating system 24 towards the header 18 (the return path). Devices in which the lower span of the conveyor assembly 82 moves in the delivery path direction are sometimes called "over slung" machines, and devices in which the upper span of the conveyor assembly 82 moves in the delivery path direction are sometimes called "under slung" machines.

In a typical conveyor assembly 82, each slat 86 is rigidly connected to a particular link of each chain 84. As that link progresses around the front and rear supports 88, 90, the link rotates in space, and the slat rotates along with the link. Thus, as apparent from FIG. 2, each slat 86 remains at the same orientation with respect to the link to which it is attached.

Conventional feeder assemblies are useful to convey crops of various types to the threshing and separating system 24. However, it has been found that some crop material can be carried by the slats 86 as they round the rear support 90, to be carried along all or a portion of the return path towards the header 18. This problem has been found to be particularly evident in the case of over slung conveyors operating to convey corn. In such situations, ears of corn lodged between the rear support 90 and the top wall 74 are broken by the slats 86, which requires extra power to operate the conveyor assembly 82 and can lead to damage, premature wear, and chain jumping. The frequency of such events can be reduced by increasing the speed of the conveyor assembly 82 to more actively throw the ears into the threshing and separating system 24, but this also requires higher power, and the increased delivery velocity can damage the ears.

Figure 3:
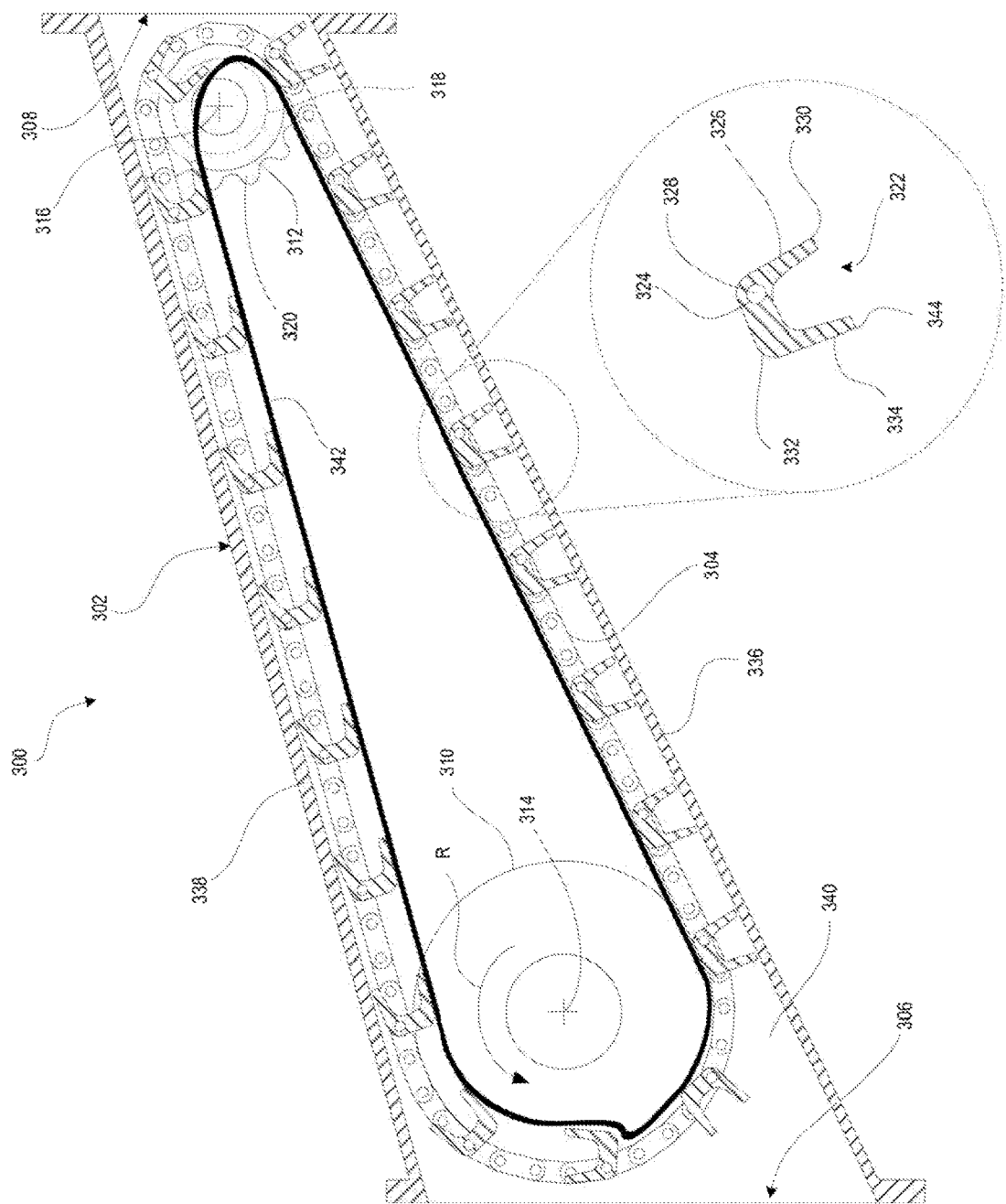
FIG. 3 is a cutaway side view of a first exemplary embodiment of a feeder assembly.
Figure 4:
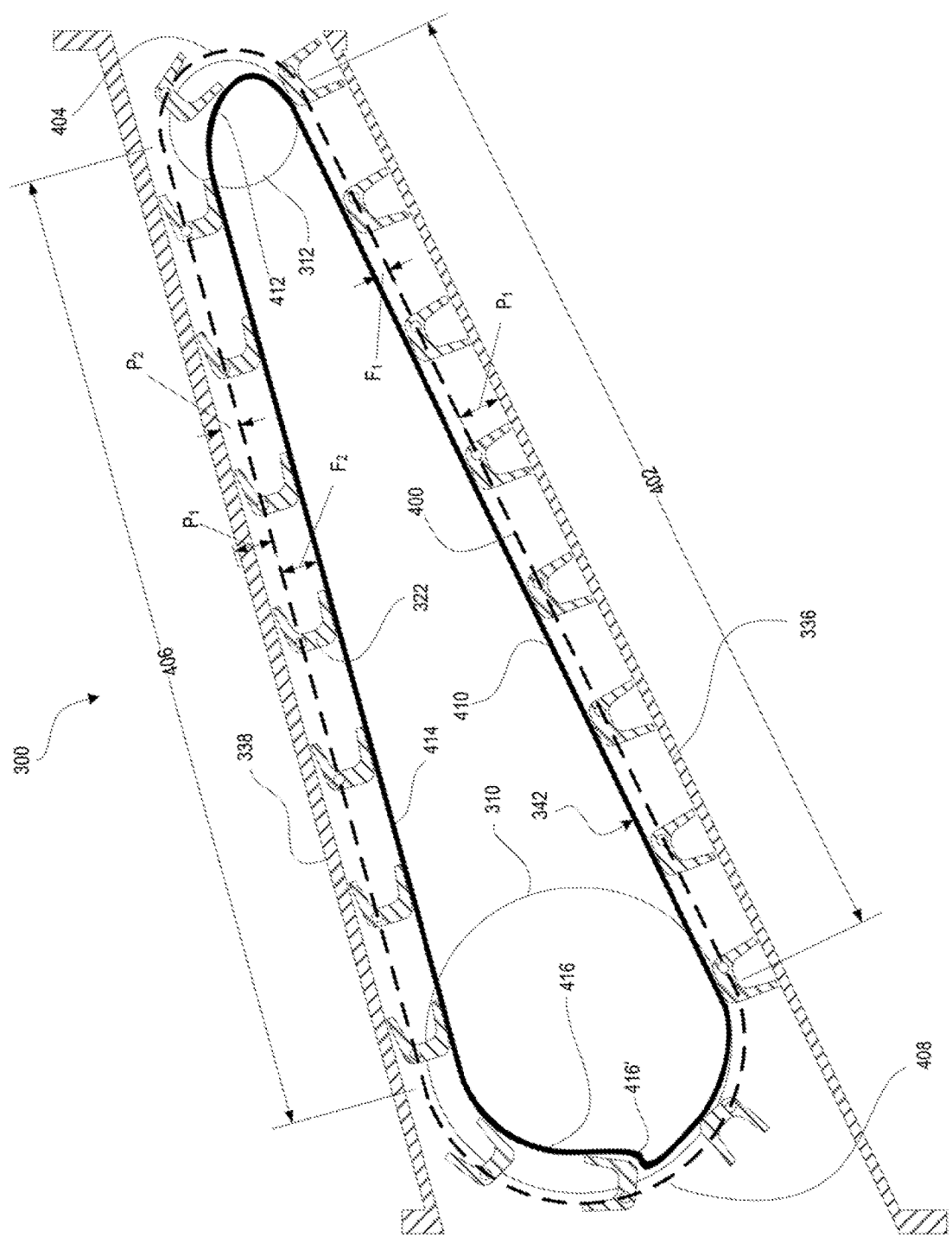
FIG. 4 is a cutaway side view of the embodiment of FIG. 3, shown with certain parts removed for clarity.
Figure 5:
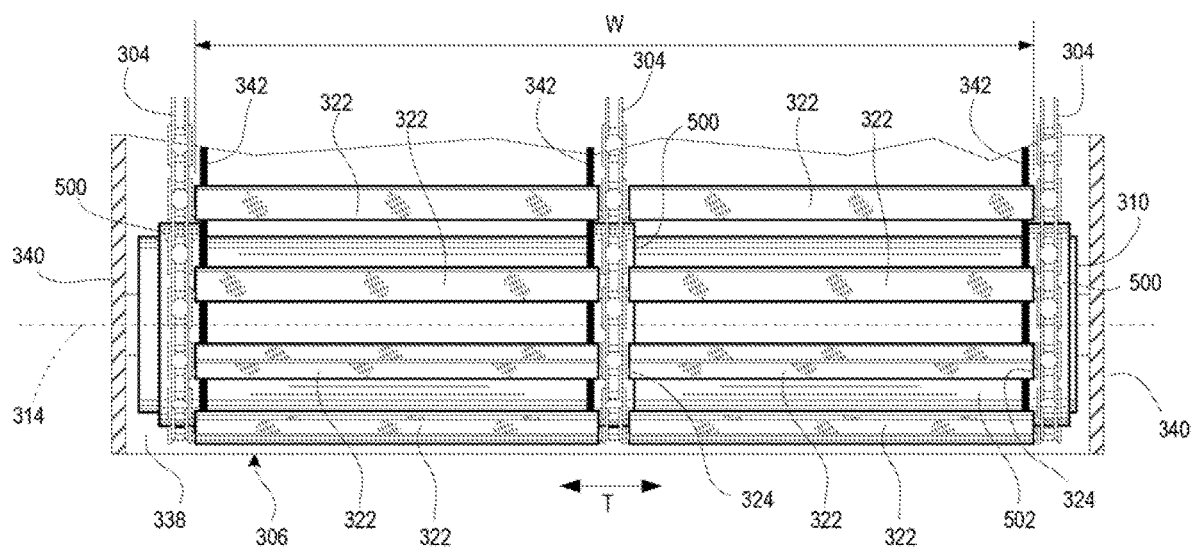
FIG. 5 is a cutaway partial top view of the embodiment of FIG. 3.

Referring now to FIGS. 3 through 5, an embodiment provides a feeder assembly 300 that is configured to reduce the incidence of crop material being trapped in the return path of the conveyor assembly, which can lead to reduced power requirements and increased harvest efficiency. In general terms, the feeder assembly 300 has a housing 302 that encloses a number of flexible conveyors, such as belts or chains 304, and, upon operation, the flexible conveyors move crop material from a housing inlet 306 to a housing outlet 308. In the example of FIGS. 3-5, the flexible conveyors are chains 304. For brevity, the flexible conveyors in this example are referred to simply as chains 304.

Each chain 304 is wrapped around a front rotation support 310 and a rear rotation support 312 to form a closed travel path 400, which is designated by a dashed line in FIG. 4 (for clarity of illustration, the chain 304 is omitted from FIG. 4). As used herein, the travel path 400 is understood to be defined by the centerline of the flexible conveyor in its normal operating position (e.g., midway between the outer and inner surfaces of a belt or chain). The front rotation support 310 is mounted to rotate about a first axis 314 that extends in a transverse direction T (FIG. 5). The transverse direction T may correspond to the combine's transverse axis (i.e., perpendicular to the fore-aft direction), but this is not required. The rear rotation support 312 is mounted to rotate about a second axis 316 that also extends in the transverse direction T. The rear rotation support 312 may be located above and behind the first rotation support 310, as generally done in combine feeder assemblies, but this is not strictly required. The rotation supports 310, 312 may comprise one or more drums, pulleys, sprockets, or other devices around which the flexible conveyor can be wrapped to provide support during movement of the flexible conveyor, as known in the art. For example, as shown in FIG. 5, the front rotation support 310 may comprise a separate support wheel 500 for each chain 304, with a drum-shaped axle 500 joining the wheels 500.

The chains 304 are driven by one or more motors 318, such as a hydraulic motor, an electric motor or a combustion engine, as known in the art. The motor 318 may be operatively connected to the chains 304 in any suitable manner. In the shown example, the motor 318 is located on the second axis 316, and is operatively connected to the chains 304 by sprockets 320 located at each chain 304. The sprockets 320 may be mounted directly on the output shaft of the motor 318, or a clutch, gear reduction pulleys, a transmission or other mechanism may be interposed between the sprockets 320 and the motor 318. The details of the drive mechanism are conventional and need not be described further herein.

A plurality of slats 322 are attached to the chains 304. Each slat extends in the transverse direction T and is connected to at least two of the chains 304 by pivots 324. The pivots 324 extend in the transverse direction T and are collinear with one another to allow the slats 322 to rotate on the pivots 324. Thus, the slats 322 can assume different positions relative to the portion of the chain 304 to which each slat 322 is attached, as discussed in more detail below.

In the shown example, each slat pivot 324 is collinear with pivot pins that join two adjacent links of the chain 304. Thus, the slats 322 pivot about a slat pivot axis 328 that is collinear with a pivot joint of the chain 304. This makes it possible to form the slat pivots 324 integrally with the chain's pivot pin. That is, a single pin can be used as both the chain pivot pin and each slat pivot 324, thereby reducing the number of parts and cost of the assembly. Other alternatives and variations will be apparent to persons of ordinary skill in the art in view of the present disclosure.

The slats 322 extend in the transverse direction to collectively cover a slat width dimension W, such as shown in FIG. 5. Here, each slat 322 is connected to two adjacent chains 322, but alternatively one or more slats 322 may be connected to more than two chains 322. The slats 322 may be arranged in rows, such as the two rows shown in FIG. 5. The slats 322 in one row may be aligned transversely with the slats 322 in an adjacent row, such as shown, or they may be staggered.

Each slat 322 has a paddle 326 that extends from the slat pivot axis 328 defined by the slat pivots 324. The paddle 326 extends to a distal paddle edge 330 (i.e., the furthermost edge of the paddle 326 from the slat pivot axis 328). The paddles 326 may have any suitable shape, such as an elongated flat plate having a uniform rectangular shape, a bar with variations in shape, or the like. One example of a slat paddle shape that can be used in embodiments is illustrated in U.S. Design Pat. No. D810,149, which is incorporated herein by reference.

Each slat 322 also has a cam follower 332, comprising a surface of the slat 322 that extends from the slat pivot axis 328 and is positioned to engage a guiding cam structure, as discussed below. The cam follower 323 may include a movable surface, such as a rotary bearing or the like, but this is not necessary. The cam follower 323 also may comprise a polished, hardened, or low friction material, or an insert that is attached to the paddle (e.g., a steel insert attached to a forged aluminum paddle), to reduce wear as the cam follower 323 moves along the guiding surface.

The slats 322 also may include a second paddle 334 that extends from the cam follower 323, such as shown in FIG. 3, or from another location on the slat 322, but this is not strictly required.

The chains 304, slats 322, and front and rear rotation supports 310, 312 are generally enclosed in the feeder housing 302, although some portions of the chains 304 and supports 310, 312 may be positioned (and the slats 322 may periodically move) outside the feeder housing 302. The feeder housing 302 provides a passage extending from the housing inlet 306 located adjacent the header 18 and the front rotation support 310, to the housing outlet 308 located adjacent the threshing and separating system 24 and the rear rotation support 312. The exemplary feeder housing 32 has a first wall 336 and an opposed second wall 338 that are located above and below the chains 304, and opposed side walls 340 that surround the transverse ends of the chains 304. The walls may form a rectangular cross-section as viewed along an axis of the housing extending between the housing inlet 306 and the housing outlet 308, but this is not strictly required. One or more walls may be removable or openable to access and service the feeder assembly 300.

In use, the motor 318 is operated to drive the sprocket, rear rotation support 312 and/or front rotation support 310. This causes the chain 304 to progress around the chain travel path 400. In the example of FIGS. 3 and 4, the supports 310, 312 rotate in the direction shown by arrow R.

As shown in FIG. 5, the chains 304 are spaced from one another along the transverse direction T. However, as viewed along the transverse direction T, the travel path 400 is the same for all of the chains 304. Referring to FIG. 4, the travel path 400 has a first chain path portion 402 extending along the first wall 336 from the front chain support 310 to the rear chain support 312, a second chain path portion 404 extending around a portion of the rear chain support 312, a third chain path portion 406 extending along the second wall 338 from the rear chain support 312 to the front chain support 312, and a fourth chain path portion 408 extending around a portion of the front chain support 310. When driven by the motor 318, each link in the chain 304 moves sequentially around the travel path 400, from the first chain path portion 402, to the second chain path portion 404, to the third chain path portion 406, to the fourth chain path portion 408 and then back to the first chain path portion 402.

The travel path 400 has two separate span portions. The first chain path portion 402 comprises a first span extending between the front rotation support 310 and the rear rotation support 312, and the third chain path portion 406 comprises a second span extending between the front rotation support 310 and the rear rotation support 312. These spans can be unsupported, such that the chain 304 is held on the travel path 400 by tension, or one or more backers may be provided to support the chain 304 along the spans. In use, one of the spans operates as a delivery span that travels from the header 18 to the threshing and separating system 24, and the other span operates as a return span that travels from the threshing and separating system 24 to the header 18. The delivery span in the embodiment of FIGS. 3-5 is located below the return span, making this an "over slung" configuration. However, this arrangement may be reversed, as noted below.

The feeder assembly 300 also includes a cam track 342 located inside the chain travel path 400. As used herein, locations "inside" the chain travel path 400 are locations that are within a perimeter delineated by the chain travel path as viewed along the transverse direction T, and such locations are not necessarily within the same plane as the chain 304. Similarly, locations "outside" the chain travel path 400 are locations that are outside a perimeter delineated by the chain travel path as viewed along the transverse direction T, and such locations are not necessarily within the same plane as the chain 304.

The shown cam track 342 has a first cam track portion 410 adjacent the first chain path portion 402, a second cam track portion 412 adjacent the second chain path portion 404, a third cam track portion 414 adjacent the third chain path portion 406, and a fourth cam track portion 416 adjacent the fourth chain path portion 408. Each portion of the cam track 342 may be joined with the adjacent portions of the cam track 342 to form a continuous track, or there may be a gap between them. Also, each separate portion of the cam track 342 may have gaps within it.

The cam track 342 is positioned to engage the cam followers 332 on the slats 322 to cause or allow the slats 322 to assume the desired position at different parts of the chain travel path 400.

In the example of FIGS. 3 and 4, the first cam track portion 410 is positioned to contact the cam followers 332 to cause the slats 322 located along the first chain path portion 402 to assume a first slat position, in which the distal paddle edge 330 is spaced outside the chain travel path 400 by a first paddle edge distance $P_1$. This is accomplished by locating the first cam track portion 410 inside the chain travel path at a first cam follower distance $F_1$ from the chain travel path 400. Thus, as the chains 304 move, the cam followers 332 contact the first cam track portion 410 and are forced to the first cam follower distance $F_1$ from the chain travel path 400. The selection of the value for the first paddle edge distance $P_1$ may be a function of the desired crop-moving capabilities (e.g., larger for larger crops, and smaller for smaller crops). And the value of the first cam follower distance $F_1$ will depend on the particular geometry of the slat 322, as will be readily understood from the present disclosure.

With the distal paddle edges 330 in the first paddle edge distance $P_1$, the paddles 326 are in a relatively extended state, and configured for gathering and moving crop material from the header 18 to the threshing and separating system 24. In this "over slung" type conveyor, the first wall 336 is a lower wall of the feeder housing 302. Thus, as the paddles 326 move along the first chain path portion 404, they push crop materials against the first wall 336 and up towards the housing outlet 308. To allow this operation, the first wall 336 extends along the first span and extends in the transverse direction along the full slat width W, and is spaced from the chain travel path 400 by at least the first paddle edge distance $P_1$ to prevent interference with the slats 322.

As noted above, it has been determined that crop material, such as ears of corn, can become trapped in a conveyor slat as it progresses to the return span. To mitigate this problem, the cam track 342 is configured to allow the paddles 326 to retract so that they are no longer pulling on the crop material as they move to the return span. For example, as shown in FIGS. 3 and 4, the second cam track portion 412 may extend from a leading edge adjacent the first cam track portion 410 to a trailing edge adjacent the third cam track portion 414, with the distance between the second cam track portion 416 and the chain travel path 400 transitioning from the first cam follower distance $F_1$ at a leading edge to a second cam follower distance $F_2$ at the trailing edge, with the second cam follower distance $F_2$ being greater than the first cam follower distance $F_1$. The transition to the larger cam follower distance allows the slats 322 to rotate under the force of gravity to a second slat position in which the distal paddle edge 330 is located a second paddle edge distance $P_2$ from the chain travel path 400, with the second paddle edge distance $P_2$ being less than the first paddle edge distance $P_1$. Thus, the paddles 322 retract as they round the rear rotation support 312 and are less inclined to continue dragging crop material towards the return span. This leads to a reduced power requirement, and less likelihood of experiencing chain jumping or premature wear of the parts. Furthermore, it is not necessary to run the chains 304 at a high speed to project the crop material clear of the return path, so the chains 304 can be operated at a relatively low speed (e.g., a speed matching the combine's travel speed along the ground), which can reduce the incidence of crop damage.

In another embodiment, the second cam track portion 412 and/or third cam track portion 414 may be omitted. In this case, as the slats 322 progress to the second chain path portion 404, the move past the cam track 342 and are free to rotate under gravitational pull and/or resistance caused by the crop materials to the second (i.e., retracted) slat position.

The cam track 342 also may be configured to help the slats 322 assume the first (i.e., extended) slat position as they approach the delivery span. For example, as shown in FIGS. 3 and 4, the fourth cam track portion 416 may extend from a leading edge adjacent the third cam track portion 414 to a trailing edge adjacent the first cam track portion 410, with the distance between the fourth cam track portion 416 and the chain travel path 400 transitioning from the second cam follower distance $F_2$ at a leading edge to the first cam follower distance $F_1$ at the trailing edge. In this case, the transition includes a discrete step 416'—that is, an abrupt change in the distance of the cam track 342 from the chain travel path 400. The discrete step 416' causes the slats 322 to rotate quickly to a new position. In other embodiments, the transition may be gradual (e.g., like the transition at the second cam track portion 412 in FIG. 4). Such discrete steps also may be provided in the second cam track portion 412 or elsewhere along the cam track 342.

The second wall 338 also may be formed as a separate cam track located outside the closed loop of the chain travel path 400, and positioned to contact the distal paddle edge 330 or other parts of the slats 322 to drive them to the second (retracted) slat position. Other alternatives and variations will be apparent to persons of ordinary skill in the art in view of the present disclosure.

It is expected that the incidence of crop material becoming trapped in the return span also may be reduced by reducing or minimizing the spacing between the return span and the adjacent wall of the feeder housing 302. This is facilitated by the movement of the slats to the second (retracted) slat position. For example, as shown in FIG. 4, the second wall 338 may be spaced from the chain travel path 400 by a distance that is greater than the second paddle edge distance $P_2$, but less than the first paddle edge distance $P_1$. This reduces the amount of space into which crop materials can be moved, and is expected to lead to a reduced volume of crop being carried to the return span.

As noted above, the slats 322 may include a second paddle 334. Each second paddle 334 is spaced from the first paddle 326, and has a respective distal second paddle edge 344 defined by its furthermost point from the slat pivot axis 328. The distal second paddle edge 344 preferably is configured to be located outside the chain travel path 400 when the slats 322 are in the first (extended) slat position, and inside the chain travel path 400 when the slats 322 are in the second (retracted) slat position. This is expected to greatly reduce the likelihood of the second paddles 334 catching and holding crop material as the chain 304 rounds the rear rotation support 312. However, this is not strictly required in all embodiments.

Figure 6:
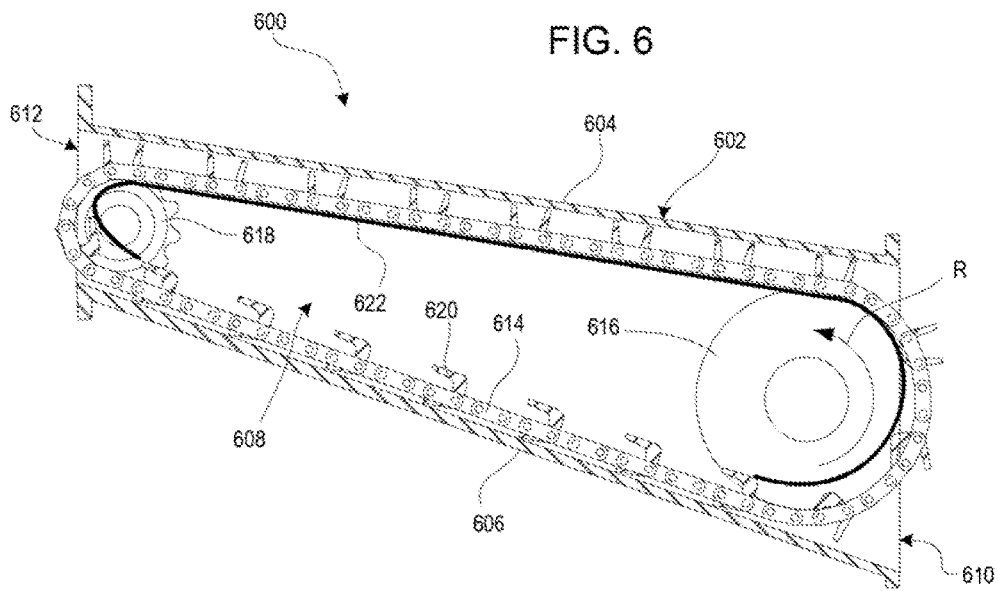
FIG. 6 is a cutaway side view of a second exemplary embodiment of a feeder assembly.

FIG. 6 shows an alternative example of a feeder assembly 600, which is configured as a "under slung" system. The feeder assembly 600 has a feeder housing 602 formed by a first wall 604, a second wall 606, and side walls 608. The walls are joined to form a closed passage from a housing inlet 610 adjacent the header 18, to a housing outlet 612 adjacent the threshing and separating system 24. Chains 614 or other flexible conveyors (e.g., belts) are looped around a front rotation support 616 and a rear rotation support 618, and driven by a motor (not shown) in the direction shown by arrow R. Here, unlike the previous embodiment, the rotation supports 616, 618 extend partially outside the housing 602. Slats 620 are pivotally mounted to the chain 614, such as described above.

The chains 614 travel along a train travel path defined by the centerline of the chain 614. The chain travel path has a first portion extending along the delivery span adjacent the upper first wall 604, a second portion extending around the rear rotation support 618, a third portion extending along the lower second wall 606, and a fourth portion extending around the front rotation support 616, similar to the embodiment described above.

A cam track 622 is provided adjacent the a portion of the chain travel path. In this case, the cam track 622 has a first portion adjacent the first chain travel path portion, which is configured to press the slats 620 upwards to the first (extended) slat position, so that the distal edges of the slats 620 are close to the first wall 604. The cam track 622 also may have transition portions that extend around the front and rear rotation supports. In the shown example, the cam track 622 does not include a portion adjacent the third part of the chain travel path. In this case, the lower second wall 606 acts as a cam track outside the chain travel path to move the slats 620 into a second (retracted) slat position during travel along the return span.

The embodiment of FIG. 6 operates essentially the same as the embodiment of FIGS. 3-5 to extend the slats 620 along the delivery span, and retract them along the return span. Thus, no further explanation is necessary here.

Figure 7:
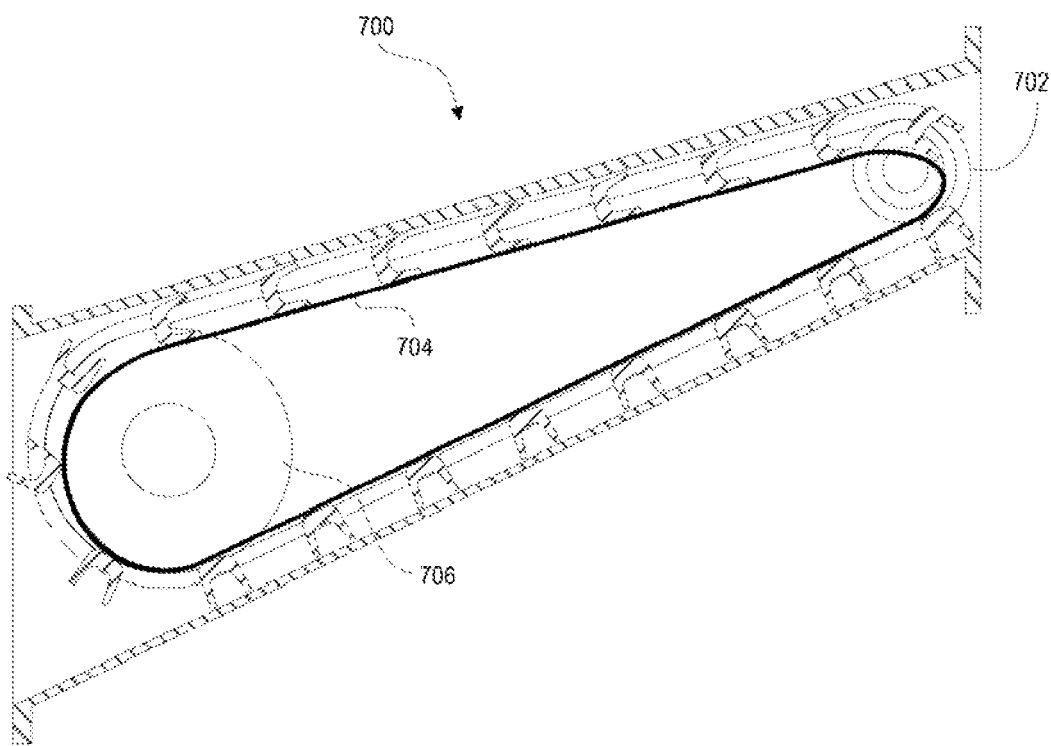
FIG. 7 is a cutaway side view of a third exemplary embodiment of a feeder assembly.

FIG. 7 illustrates another example of a feeder assembly 700. This example is generally the same as the example of FIGS. 3-5, but the chains are replaced by belts 702, and the cam track 704 has a gentle transition at the front rotation support 706 instead of a discrete step as shown in FIGS. 3 and 4. The operation of this example is generally the same as that of the previous embodiments, and need not be discussed further herein.

Figure 8:
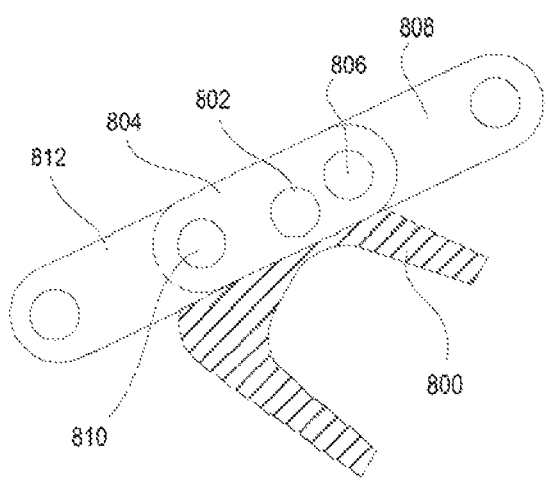
FIG. 8 illustrates an alternative example of an interface between a slat and a chain.

FIG. 8 shows an alternative mounting arrangement for a slat 800. In this case, a slat pivot 802 connects the slat 800 to a link 804 of a chain at a location along the span of the link 804. Thus, the slat pivot 802 is offset from a first chain pivot pin 806 joining the link 804 to a first adjacent link 808, and is offset from a second chain pivot pin 810 joining the link to a second adjacent link 812.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A feeder assembly for an agricultural combine, the feeder assembly comprising:
   a front rotation support configured to rotate on a first axis extending in a transverse direction;
   a rear rotation support configured to rotate on a second axis extending in the transverse direction;
   a plurality of flexible conveyors wrapped around the front rotation support and the rear rotation support along a closed travel path having a first span extending between the front rotation support and the rear rotation support, and a second span extending between the front rotation support and the rear rotation support;
   a plurality of slats extending by a slat width dimension in the transverse direction and pivotally connected to the plurality of flexible conveyors to rotate about a respective slat pivot axis extending in the transverse direction, each slat having a paddle that is movable between a first slat position in which the paddle extends outside the closed travel path by a first distance, and a second slat position in which the paddle does not extend outside the closed travel path or extends outside the closed travel path by a second distance that is less than the first distance;
   a cam surface positioned along the first span of the closed travel path and the configured to move the plurality of slats to the first slat position;
   a first housing wall extending in the transverse direction over the slat width dimension and along the first span, the first housing wall being spaced from the closed travel path by at least the first distance; and
   a second housing wall extending in the transverse direction over the slat width dimension and along the second span, the second housing wall being spaced from the closed travel path by less than the first distance.

2. The feeder assembly of claim 1, wherein the flexible conveyors comprise chains or belts.

3. The feeder assembly of claim 1, wherein the first span is located below the second span.

4. The feeder assembly of claim 1, wherein the first span is located above the second span.

5. The feeder assembly of claim 1, further comprising a motor configured to drive the plurality of flexible conveyors to move the plurality of slats along the first span from the front rotation support towards the rear rotation support.

6. A feeder assembly for an agricultural combine, the feeder assembly comprising:
   a front chain support;
   a rear chain support;
   a feeder housing forming an enclosed passage from an inlet adjacent the front chain support to an outlet adjacent the rear chain support, the feeder housing having a first wall, a second wall and side walls joining the first wall to the second wall;
   a plurality of chains spaced from one another along a transverse direction, each chain extending in a respective closed loop around the front chain support and the rear chain support, and along a chain travel path having a first chain path portion extending along the first wall from the front chain support to the rear chain support, a second chain path portion extending around a portion of the rear chain support, a third chain path portion extending along the second wall from the rear chain support to the front chain support, and a fourth chain path portion extending around a portion of the front chain support;
   a motor operatively connected to the plurality of chains and configured to move the chains continuously along the chain travel path in sequential order from the first chain path portion to the fourth chain path portion;
   a plurality of slats extending in the transverse direction, each slat comprising:
      slat pivots extending collinearly along a slat pivot axis extending in the transverse direction and connecting the slat to at least two of the plurality of chains,
      a first paddle extending from the slat pivot axis to a distal first paddle edge, and
      a cam follower offset from the slat pivot axis,
      wherein each slat is movable about the slat pivot axis between:
         a first slat position in which the distal first paddle edge is located outside the chain travel path at a first paddle edge distance from the chain travel path and the cam follower is located a first cam follower distance from the chain travel path, and
         a second slat position in which the distal first paddle edge is located a second paddle edge distance from the chain travel path and the cam follower is located inside the chain travel path at a second cam follower distance from the chain travel path, wherein the first paddle edge distance is greater than the second paddle edge distance, and the first cam follower distance is less than the second cam follower distance; and a cam track located inside the chain travel path, the cam track having a first cam track portion adjacent the first chain path portion, the first cam track portion being spaced from the first chain path portion by the first cam follower distance to thereby cause the plurality of slats to assume the first slat position along the first chain path portion;

wherein the first chain path portion is spaced from the first wall by at least the first paddle edge distance, and the third chain path portion is spaced from the second wall by less than the first paddle edge distance.

7. The feeder assembly of claim 6, wherein the first chain path portion is located below the third chain path portion and the first wall is located below the second wall.

8. The feeder assembly of claim 6, wherein the first chain path portion is located above the third chain path portion and the first wall is located above the second wall.

9. The feeder assembly of claim 6, wherein the cam track further comprises:
a second cam track portion adjacent the second chain path portion,
a third cam track portion adjacent the third chain path portion, the third cam track being spaced from the third chain path portion by the second cam follower distance, and
a fourth cam track portion adjacent the fourth chain path portion.

10. The feeder assembly of claim 9, wherein a distance between the second cam track portion and the chain travel path transitions from the first cam follower distance at a leading end adjacent the first cam track portion, to the second cam follower distance at a trailing end adjacent the third cam track portion.

11. The feeder assembly of claim 10, wherein the distance between the second cam track portion and the chain travel path continuously transitions from the first cam follower distance to the second cam follower distance.

12. The feeder assembly of claim 10, wherein the distance between the second cam track portion and the chain travel path transitions from the first cam follower distance to the second cam follower distance in one or more discrete steps.

13. The feeder assembly of claim 9, wherein a distance between the fourth cam track portion and the chain travel path transitions from the second cam follower distance at a leading end adjacent the third cam track portion, to the first cam follower distance at a trailing end adjacent the first cam track portion.

14. The feeder assembly of claim 13, wherein the distance between the fourth cam track portion and the chain travel path continuously transitions from the second cam follower distance to the first cam follower distance.

15. The feeder assembly of claim 13, wherein the distance between the fourth cam track portion and the chain travel path transitions from the second cam follower distance to the first cam follower distance in one or more discrete steps.

16. The feeder assembly of claim 6, wherein each slat further comprises a second paddle extending from the cam follower to distal second paddle edge, the distal second paddle edge being spaced from the first distal paddle edge, and:

in the first slat position the distal second paddle edge is located outside the chain travel path, and
in the second slat position the distal second paddle edge is located inside the chain travel path.

17. The feeder assembly of claim 6, wherein each slat pivot is collinear with a pivot pin joining two adjacent links of one of the chains.

18. The feeder assembly of claim 6, wherein each slat pivot is positioned on a link of one of the chains at a location offset from a first pivot pin joining the link to a first adjacent link and a second pivot pin joining the link to a second adjacent link.

19. The feeder assembly of claim 6, wherein the motor is operatively connected to the plurality of chains by one or more drive sprockets positioned collinearly with the rear chain support.

20. An agricultural combine comprising:
a header;
a threshing and separating system;
a front chain support adjacent the header;
a rear chain support adjacent the threshing and separating system;
a feeder housing forming an enclosed passage from the header to the threshing and separating system, the feeder housing having a first wall, a second wall and side walls joining the first wall to the second wall;
a plurality of chains spaced from one another along a transverse direction, each chain extending in a respective closed loop around the front chain support and the rear chain support, and along a chain travel path having a first chain path portion extending along the first wall from the front chain support to the rear chain support, a second chain path portion extending around a portion of the rear chain support, a third chain path portion extending along the second wall from the rear chain support to the front chain support, and a fourth chain path portion extending around a portion of the front chain support;
a motor operatively connected to the plurality of chains and configured to move the chains continuously along the chain travel path in sequential order from the first chain path portion to the fourth chain path portion;
a plurality of slats extending in the transverse direction, each slat comprising:
slat pivots extending collinearly along a slat pivot axis extending in the transverse direction and connecting the slat to at least two of the plurality of chains,
a first paddle extending from the slat pivot axis to a distal first paddle edge, and
a cam follower offset from the slat pivot axis,
wherein each slat is movable about the slat pivot axis between:
a first slat position in which the distal first paddle edge is located outside the chain travel path at a first paddle edge distance from the chain travel path and the cam follower is located a first cam follower distance from the chain travel path, and
a second slat position in which the distal first paddle edge is located a second paddle edge distance from the chain travel path and the cam follower is located inside the chain travel path at a second cam follower distance from the chain travel path, wherein the first paddle edge distance is greater than the second paddle edge distance, and the first cam follower distance is less than the second cam follower distance; and a cam track located inside the chain travel path, the cam track having a first cam track portion adjacent the first chain path portion, the first cam track portion being spaced from the first chain path portion by the first cam follower distance to thereby cause the plurality of slats to assume the first slat position along the first chain path portion;

wherein the first chain path portion is spaced from the first wall by at least the first paddle edge distance, and the third chain path portion is spaced from the second wall by less than the first paddle edge distance.

\* \* \* \* \*